3,642,864
ESTERS OF N-ARYL-ANTHRANILIC ACIDS WITH MONOSUBSTITUTED GEM-DIOLS
Elso Manghisi, Milan, Italy, assignor to Istituto Luso Farmaco d'Italia S.r.L., Milan, Italy
No Drawing. Filed Oct. 23, 1968, Ser. No. 770,060
Claims priority, application Italy, Apr. 12, 1968, 15,229/68
Int. Cl. C07c 101/54
U.S. Cl. 260—471 R        8 Claims

ABSTRACT OF THE DISCLOSURE

Various methods of preparation of novel N-aryl-anthranilic acid esters having the formula

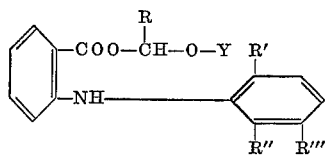

are described. These products have very good therapeutical properties, such as anti-inflammatory, antipyretic and analgesic action, and administration forms are given.

---

This invention relates to novel esters of N-aryl-anthranilic acids and processes for their preparation.

This invention particularly relates to compounds having the general formula

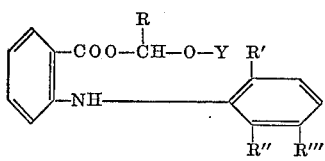

wherein:

R represents a hydrogen atom or a lower alkyl radical
R', R'', R''' are selected from the group consisting of hydrogen, halogen, lower alkyl or trifluoromethyl groups
Y is selected from the group consisting of hydrogen, a lower alkyl radical, or acyl radical of aromatic aliphatic organic acids.

According to the invention, the compounds of general Formula I can be prepared by directly esterifying the substituted N-aryl-anthranilic acids with simple or mono-etherified or acylated gem-diol compounds, preferably with an esterification catalyst, such as inorganic acid or p-toluenesulfonic or Lewis acid. The reaction can be effected with an excess of mono-etherified or acrylated gem-diols, with or without inert solvents, such as benzene, tolluene, etc. forming an azeotrope with water, to remove it from the reaction mixture.

The method may be represented by the equation:

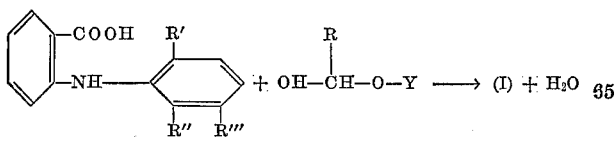

wherein R, Y, R', R'', R''' have the above-mentioned meanings.

The products of general Formula I may furthermore be prepared by reacting a metal salt of N-aryl-anthranilic acid with a reactive derivative of mono-etherified or acylated gem-diols as follows:

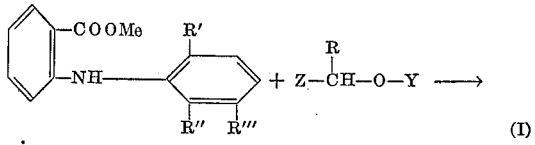

wherein:
Z is halogen or tosyl radical or others
Y is a lower alkyl radical or an acyl aliphatic or aromatic radical and
R, R', R'', R''' have the above-mentioned meanings
Me is a metal, preferably sodium.

According to the invention, the compounds of the invention may be prepared by reacting an appropriate N-aryl-anthranilic acid derivative (the halogen derivative or one of its anhydrides, symmetrical or mixed, etc.) with a mono-etherified or acylated gem-diol as follows:

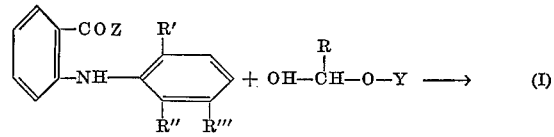

wherein:
Z is halogen or acyl radical each corresponding respectively to N-aryl-anthranilic acid chloride or to its symmetrical or mixed anhydride
R, R', R'', R''' have the above-mentioned meanings (It is to be noted that N-aryl-anthranilic acid chloride is obtainable only when the R' and R''' groups do not represent hydrogen.)

Also the ester-interchange of the methyl ester (or other alkyl or aminoalkyl esters) with a monoetherified or monoacylated gem-diol, with a suitable catalyst (Na, EtONa, NaH, NaNH₂, etc. or with strong acid), may give the claimed products as follows:

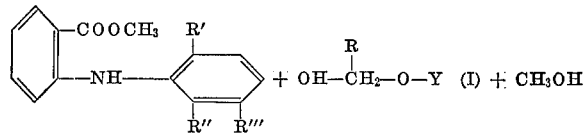

wherein: R, R', R'', R''' and Y have the above-mentioned meanings.

Furthermore, the compounds of general Formula I may be prepared as follows by reacting a reactive derivative of N-aryl-anthranilic acid (for example, chloride), with an aldehyde and by condensing the thus obtained halogen-methyl derivative with the sodium salt of an alcohol or acid:

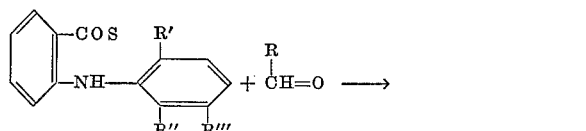

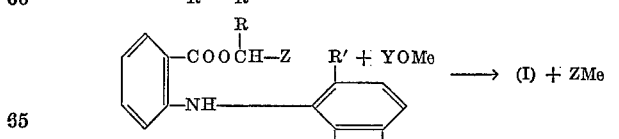

wherein: Z, R, R', R'', R''' and Y have the above meanings. This variation of the process is possible only when R' and R'' are not hydrogen.

The products claimed may also be prepared either by reacting the monoester of N-aryl-anthranilic acid and a gem-diol with a Y—Z product wherein Y has the above meaning and Z is a reactive group capable of forming esters or ethers with a free alcoholic group as follows:

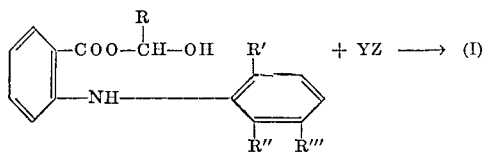

or by reacting the corresponding nitriles of the aryl-anthranilic acids, which are reacted with the corresponding gem-diols.

The products of Formula I have very good therapeutical properties, such as anti-inflammatory, antipyretic and analgesic action.

The main characteristic of said products is that, besides maintaining the activity of the similar products already known in literature (see, for example, British Pats. Nos. 1,046,319, 1,027,060, Belgian Pats. 605,303, 605,304, 630,-053, French Pat. 1,315,030 and Special French Medicament Pat. 2,948) and clinically tested, they have much lower chronic and acute toxicity with all of the advantages which such characteristic has for medical use of the substances.

Furthermore, the substances do not have the secondary effects on the gastric and intestinal mucosa.

These novel substances may be mixed with pharmaceutical vehicles and excipients suitable for forming pharmaceutical compounds which enter within the present invention.

Thus, for the parenteral administration they may be suspended in water or other liquids or dissolved in suitable solvents (glycofurole, methylideneglycerol, and others).

For oral administration the compounds may be in the form of tablets, capsules, pearls, cachets or syrups.

For rectal administration the substances may be incorporated in the normally used excipients (cocoa butter, glycerides, etc.).

The formulation for topical use are also foreseen, for which the usual technical preparations of the various pharmaceutical forms are valid (ointments, lotions, etc.).

The following examples serve to illustrate the synthesis methods of the invention without limiting it:

EXAMPLE I

Ethoxymethyl-ester of N-2,6-dichloro-m-tolyl-anthranilic acid 10 g. sodium salt of N-2,6-dichloro-m-tolyl-anthranilic acid, 3 ml. chloromethyl-ethylether and 80 ml. dry acetone were refluxed for 12 hours on waterbath under stirring. The solid was filtered off, and the solution evaporated to dryness. The residue was dissolved in chloroform, washed with sodium carbonate solution, then with water until neutral. After drying on sodium sulfate, the solution was evaporated to dryness. The obtained product was recrystallized from 95% ethanol.

Melting point 73–74° C.
U.V. absorption in ethanol. Max at—

278 m$\mu$ (E$_{1cm.}^{1\%}$=186)

and 338 m$\mu$ (E$_{1cm.}^{1\%}$=216)

Analysis.—Calc. (percent): C, 57.64; H, 4.83; N, 3.95. Found (percent): C, 57.98; H, 4.77; N, 4.13.

EXAMPLE II

Ethoxymethyl-ester of N-2,6-dichloro-m-tolyl-anthranilic acid

To a benzene solution of 50 g. N-2,6-dichloro-m-tolyl-anthranilic acid, an excess of ethoxy-methanol and a little amount p-toluensulfonic acid were added. The mixture was refluxed, and the water formed during the reaction caried off by benzene as azeotrope and separated by a Markusson apparatus. When the water amount raised the calculated value; the reaction mixture was cooled, washed with sodium carbonate solution (10%) and water until neutral. The benzene layer was evaporated to dryness in vacuo, and the residue recrystallized from ethanol. M.P. 73–74° C.

EXAMPLE III

Ethoxymethyly-ester of 2,6-dichloro-m-tolyl-anthranilic acid

To a suspension of 296 g. N-2,6-dichloro-m-tolyl-anthranilic acid in anhydrous benzene, 208 g. phosphorous pentachloride were added portion-wise. After refluxing under stirring during 24 hours, the solution was evaporated to dryness. The resulting crude product was added portionwise to a cooled benzene solution containing 76 g. ethoxymethanol with an excess of dimethylaniline. The mixture was left at room temperature, then refluxed 1 hour and evaporated to dryness and washed with sodium carbonate solution and then with water until neutral. The solution was dried on sodium sulfate and concentrated. The residue was recrystallized from ethanol, M.P. 73–74° C.

EXAMPLE IV

Ethoxymethyl ester of N-2,3,-xylyl-anthranilic acid 13.2 g. of sodium salt of N-2,3-xylylanthranilic acid, 5.2 g. chloromethyl-ethylether and 100 ml. acetone were refluxed for 1 hour under stirring.

The mixture was filtered and evaporated to dryness. The residue was passed through a chromatographic column containing neutral Alox II and recrystallized from 95% ethanol. M.P. 83–84° C.

Analysis.—Calc. (percent): C, 72.3; H, 7.06; N, 4.67. Found (percent): C, 72.00; H, 7.00; N, 4.50.

EXAMPLE V

Methoxymethyl ester of N-2,3-xylyl-anthranilic acid 24.1 g. N-2,3-xylyl-anthranilic acid were refluxed with 900 ml. methanol and 25 ml. concentrated sulfuric acid during 100 hours. The solution was then evaporated to dryness in vacuo; the residue was taken up with ice-water and extracted with ether. The organic layer was first washed with diluted sodium carobnate solution, then with water until neutral, dried on sodium sulfate and evaporated to dryness. The methyl ester was recrystallized from ethanol. M.P. 94° C.

25.3 g. methyl ester of N-2,3-xylyl-anthranilic acid were then added to methoxymethanol in excess containing a little amount of sodium metal.

The mixture was heated for several hours under nitrogen, and the formed methanol distilled off through a fractionating column.

When the theoretical amount of methanol was taken off, the reaction mixture was cooled, diluted with chloroform and the chloroform layer washed with sodium carbonate and water until neutral.

The chloroform layer was dried with sodium sulfate and evaporated to dryness. The residue was dissolved in acetone, passed through a chromatographic column containing neutral Alox II.

The product obtained by concentrating the eluted solution from the column was recrystallized from ligroin. M.P. 83–85° C.

Analysis.—Calc. (percent): C, 71.56; H, 6.71; N, 4.91. Found (percent): C. 71.2; H, 6.8; N, 5.0.

EXAMPLE VI

Benzoyloxymethyl ester of N-2,6-dichloro-m-tolyl-anthranilic acid

The chloroformic solution of 314.4 g. (1 mole) N-2,6-dichloro-m-tolyl-anthranilyl chloride (prepared as above described) was added with an equivalent amount of formaldehyde (in paraformaldehyde form) and refluxed several hours until all of the formaldehyde was dissolved.

The benzene solution of chloromethyl-derivative was refluxed during 2 hours with 144 g. sodium benzoate, the formed sodium chloride filtered, and the solution brought to dryness. The residue was taken in chloroform again and the chloroformic solution passed through a chromatographic column containing Alox II. The obtained solution was concentrated and the residue recrystallized from ligroin. M.P. 124–125.5° C.

*Analysis.*—Calc. (percent): C, 61.4; H, 3.98; N, 3.35. Found (percent): C, 61.2; H, 3.70; N, 3.3.

EXAMPLE VII

Benzoyloxymethyl ester of N-2,6-dichloro-m-tolyl-anthranilic acid

A mixture of 15 g. sodium salt of N-2,6-dichloro-m-tolyl-anthranilic acid, 8.1 g. chloromethyl-benzoate and 150 ml. acetone were refluxed under stirring on water bath during 3 hours.

The obtained solid product was filtered, dried, dissolved in chloroform and passed through chromatographic column containing alkaline Alox II. The product was recrystallized from ligroin. M.P. 124–125.5° C.

EXAMPLE VIII

Acetoxymethyl ester of N-($\alpha,\alpha,\alpha$-trifluoro-m-tolyl)-anthranilic acid A mixture of 15 g. sodium salt of N-($\alpha,\alpha,\alpha$-trifluoro-m-tolyl)-anthranilic acid, 8.4 g. bromomethyl acetate and 150 ml. dry acetone was refluxed under stirring during 4 hours in a water bath.

The obtained solid product was filtered off, and the solution concentrated. The residue was taken up with chloroform, and the chloroformic solution was washed with 10% sodium bicarbonate solution and then with water. The organic layer was dried with sodium sulfate and concentrated. The residue product is an oil.

*Analysis.*—Calc. (percent): C, 57.90; H, 3.99; N, 3.96. Found (percent): C, 57.90; H, 3.98; N, 3.90.

EXAMPLE IX

Acetoxymethyl ester of N-2,6-dichloro-m-tolyl-anthranilic acid

To a chloroformic solution of 296 g. N-2,6-dichloro-m-tolyl-anthranilic acid, 1 mole of formaldehyde (in paraformaldehyde form) and a little amount of p-toluene-sulfonic acid were added, and the mixture was refluxed during 5 hours.

The mixture was cooled, 102 g. acetic anhydride were added, and the mixture was stirred during 5 hours, then washed with sodium bicarbonate solution and water until neutral.

The chloroformic solution was dried with sodium sulfate and then concentrated to dryness. The residue was recrystallized from acetone. M.P. 132–134° C.

*Analysis.*—Calc. (percent): C, 55.45; H, 4.11; N, 3.80. Found (percent): C, 55.71; H, 4.15; N, 3.94.

EXAMPLE X

Benzoyloxymethyl ester of N-($\alpha,\alpha,\alpha$-trifluoro-m-tolyl)-anthranilic acid 12 g. sodium salt of N-($\alpha,\alpha,\alpha$-trifluoro-m-tolyl)-anthranilic acid, were suspended in dry acetone, and 7 g. chloromethyl benzoate were added. The reaction mixture was refluxed for 4 hours under stirring. The mixture was filtered and evaporated to dryness. The residue dissolved in chloroform was passed through a chromatographic column containing alkaline Alox II. The product obtained by concentrating the chloroformic solution, was recrystallized from petroleum ether. M.P. 85°–85.5° C.

*Analysis.*—Calc. (percent): C, 63.7; H, 3.88; N, 3.37. Found (percent): C, 63.68; H, 3.85; N, 3.30.

I claim:

1. An ester of N-aryl-anthranilic acid having the formula:

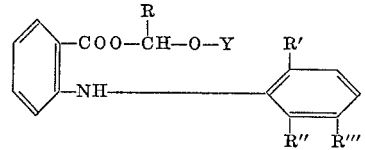

wherein:

R is hydrogen or a lower alkyl radical;
R′, R″, R‴ are hydrogen, a lower alkyl radical, fluorine, chlorine, or a trifluoromethyl group; and
Y is hydrogen, acetyl, a lower alkyl radical or benzoyl.

2. As a product according to claim 1, ethoxylmethyl ester of N-2,6-dichloro-m-tolyl-anthranilic acid.
3. As a product according to claim 1, ethoxymethyl ester of N-2,3-xylyl-anthranilic acid.
4. As a product according to claim 1, methoxymethyl ester of N-2,3-xylyl-anthranilic acid.
5. As a product according to claim 1, benzoyloxymethyl ester of N-2,6-dichloro-m-tolyl-anthranilic acid.
6. As a product according to claim 1, acetoxymethyl ester of N-($\alpha,\alpha,\alpha$-trifluoro-m-tolyl)-anthranilic acid.
7. As a product according to claim 1, acetoxymethyl ester of N-2,6-dichloro-m-tolyl-anthranilic acid.
8. As a product according to claim 1, benzoyloxymethyl ester of N-($\alpha,\alpha,\alpha$-trifluoro-m-tolyl)-anthranilic acid.

References Cited

UNITED STATES PATENTS 3,313,848  4/1967  Scherrer et al. _____ 260—471

LORRAINE A. WEINBERGER, Primary Examiner

L. A. THAXTON, Assistant Examiner

U.S. Cl. X.R.

424—310